Dec. 11, 1962 G. O. GRAVES 3,067,671
FOOD PROCESSING MACHINE
Filed Jan. 30, 1959 2 Sheets-Sheet 1

INVENTOR.
GEORGE O. GRAVES
BY M. A. Hobbs
ATTORNEY

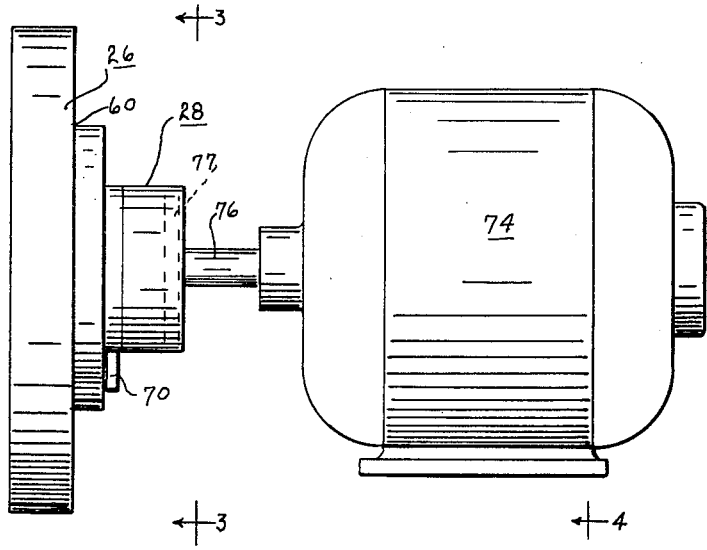
FIG. 2
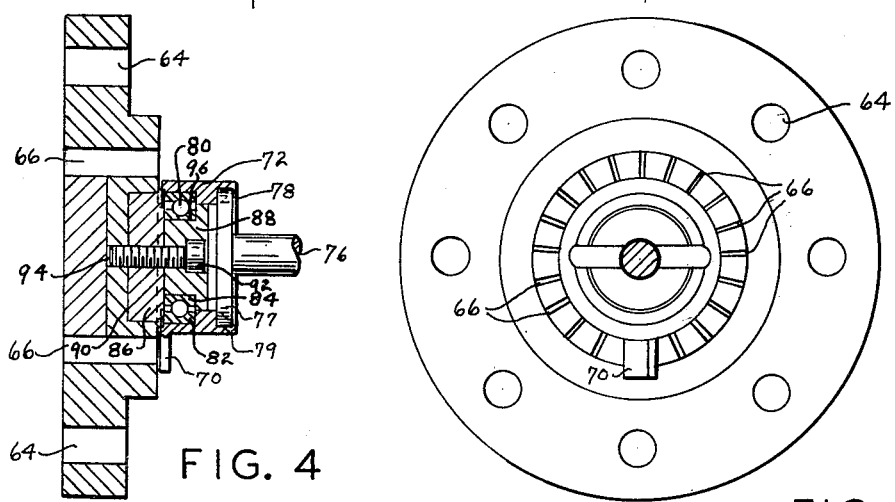
FIG. 4
FIG. 3
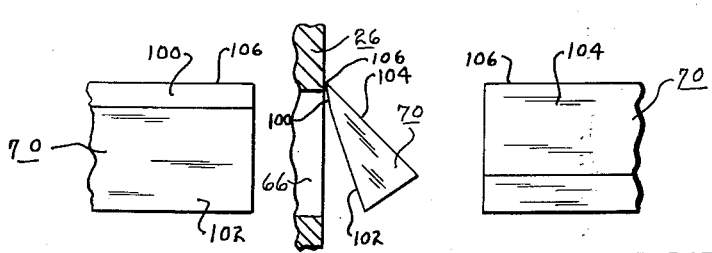
FIG. 7
FIG. 5
FIG. 6
INVENTOR.
GEORGE O. GRAVES
BY M. A. Hobbs
ATTORNEY United States Patent Office 3,067,671
Patented Dec. 11, 1962

3,067,671
FOOD PROCESSING MACHINE
George O. Graves, South Bend, Ind.
Filed Jan. 30, 1959, Ser. No. 790,112
9 Claims. (Cl. 99—238)

The present invention relates to a food processing machine and more particularly to a machine for producing cereal products such as corn meal sticks or collets in predetermined lengths or sections.

In the processing of corn meal to produce corn sticks, or collets, the meal is first mixed with water in an amount less than that required to form a paste, and the resultant mixture is ground and extruded at a temperature sufficiently high to vaporize the moisture in the corn meal mix. The material as it emerges from the extrusion die puffs into a highly cellular and relatively brittle material and is cut into sections of the desired length. The material thus produced is further processed by baking, salting and coating with a flavoring material such as a cheese mix, and is then packaged ready for shipping. The final product to be satisfactory must be uniform in texture and flavor and should be substantially the same size, shape and length. Since the material immediately on emerging from the holes in the extrusion die, the point in the operation where the material is cut into sections of the desired length, is in the transition state between the fluid material and the final brittle product, the manner in which the material is cut is highly important to the final shape, texture and appearance. If the material is cut too soon or too close to the die, where the material is still slightly soft, the final product will often have deformed, compressed and/or distorted ends which not only harm the appearance of the final product but often contain hard or tough spots resulting in a non-uniform texture in a particular stick and from stick to stick. If the cutting is performed after the material has had time to become brittle, the ends of the final sections have a broken and jagged appearance. It is therefore one of the principal objects of the present invention to provide a mechanism for cutting the material as it emerges from the die, which is so designed and spaced from the die that a pleasing uniform appearance and texture are obtained at both ends of the severed sections, and which overcomes the aforementioned difficulties.

Another object of the invention is to provide a knife means for cutting extruded cereal mixture into sections which is relatively simple in construction and operation and which is readily adaptable to materials of different constituencies without any substantial changes in design of the knife or its position relative to the extrusion die.

Still another object is to provide a knife for cutting the aforesaid material into desired sections with uniform texture and shape at or in the end parts thereof.

A further object of the invention is to provide a compact, durable mechanism for cutting sections of extruded corn and other meals into sections of the desired length, which can be easily controlled, serviced and repaired, and which will operate efficiently over long periods of time without attention or servicing.

In order to obtain the foregoing objects and other objects which will become apparent from the following description, the present machine includes a hopper for the corn meal, or the like, a mixing chamber which receives the meal from the hopper and mixes it with a small amount of water, an extrusion die providing one or more extrusion stages for the cornmeal mix, and a means for receiving the mix from the mixing chamber and forcing it through the extrusion die while said die is maintained at a temperature sufficient to vaporize the moisture initially in the meal and that added to form the mix. As the material leaves the die the vaporized moisture expands, producing a highly cellular, prebaked material. A power operated knife or the like synchronized with the operation of the means propelling the meal through the die is provided for cutting the extruded material into the desired lengths. These sticks or sections of extruded and puffed material are referred to in the trade as "collets." My invention may be more fully understood by reference to the accompanying drawings, wherein:

FIGURE 2 is an enlarged side elevational view of the extrusion die plate and my novel cutting mechanism incorporated in the machine shown in FIGURE 1;

FIGURE 3 is an elevational and partial cross sectional view of the plate and cutting mechanism shown in FIGURE 2, taken on line 3—3 of FIGURE 2;

FIGURE 4 is a vertical cross sectional view of the plate and cutting mechanism shown in the preceding figures, taken on line 4—4 of FIGURE 3;

FIGURE 5 is an end view of the knife employed in the cutting mechanism showing its operating relationship with the adjacent face of the die plate;

FIGURE 6 is a fragmentary plan view of the front side of the knife shown in FIGURE 5; and FIGURE 7 is a fragmentary plan view of the back side of the knife shown in FIGURE 5.

Figure 1:
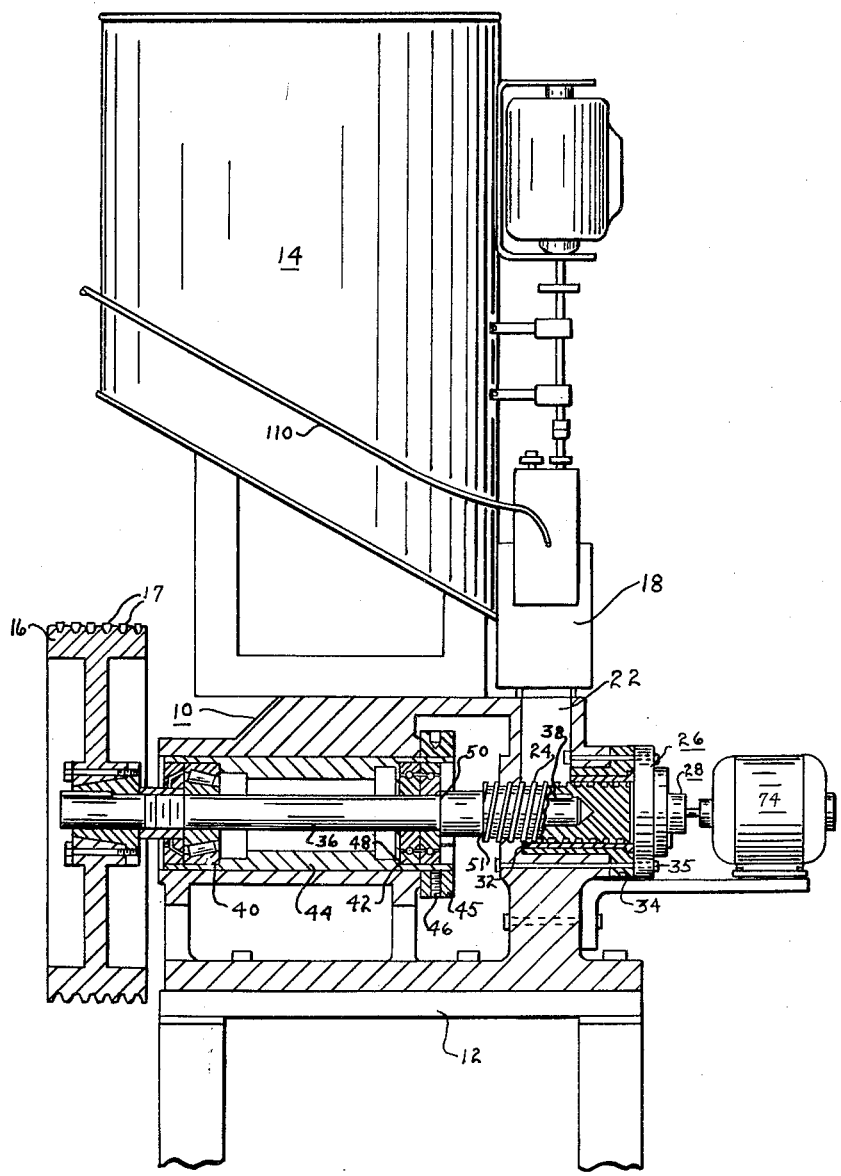
FIGURE 1 is a side elevational and partial cross sectional view of a food processing machine embodying my invention for producing collets or sticks from cereal such as cornmeal.

Referring more specifically to the drawings, a housing 10 which contains the meal extruding mechanism is mounted on a base 12 and supports a hopper 14 for the corn meal ready to be processed by the machine. The meal extruding mechanism is driven through a pulley 16 and a plurality of V-belts 17 by a motor (not shown) mounted in the lower portion of base 12, and is supplied with corn meal from hopper 14 through a chamber 18 in which the meal is mixed with a small amount of moisture, thoroughly stirred and thence discharged into the throat 22 of the extruding mechanism. This mixture is propelled by a screw 24 toward the right, as shown in FIGURE 1, and extruded through the holes in a head plate 26 at a temperature sufficiently high to vaporize the moisture in the mixture and to prebake the material sufficiently to render it relatively brittle. As the material emerges from the holes in the head plate in cylindrical form it is cut into sections of the desired length by a revolving power driven knife mechanism generally shown at numeral 28. The sections fall into a chute and thence into a container placed below the machine.

The extruding mechanism is mounted in the housing and consists of screw 24, an insert 32 in which the screw rotates, and head plate 26 through which the meal is extruded under the pressure created by rotation of the screw propelling the meal toward the plate. Insert 32 which may have either a smooth internal surface or a helical groove resembling the screw threads on screw 24 is seated in an adapter 34 disposed in a horizontal bore in the housing. The adapter and sleeve are held in place in the bore by a plurality of bolts or screws 35 extending through the head plate and the upright in which those elements are seated. Screw 24 is driven by the motor through pulley 16 and shaft 36 which is connected to said screw by a spline 38 and is journaled in roller bearing 40 and thrust bearing 42 mounted in the ends of sleeve 44 disposed in a horizontal bore in the housing and held in a fixed position by a collar 45 and set screw 46. Thrust bearing 42 is supported against axial movement away from screw 24 by an annular shoulder 48 on the internal surface of sleeve 44 and shaft 36 is supported against similar axial movement by an annular shoulder 50 on said shaft bearing against the thrust bearing. A second annular shoulder 51 on shaft 36 forms an abutment for screw 24 and prevents it from moving away from the head plate under the pressure created by the screw propelling the meal toward and through the plate. Machines of the foregoing general construction and design with various extrusion die plates are disclosed in detail in my co-pending patent applications Serial Nos. 724,030 filed March 26, 1958, now U.S. Patent No. 3,037,442, and 737,884 filed May 26, 1958, and my Patents Nos. 2,842,072 and 2,853,027.

For the purpose of the present description, extrusion die plate 26 can be any one of those disclosed in the aforementioned applications or patents, consisting generally of a disc shaped plate 60 secured to housing 10 by bolts 35 extending through holes 64 in the plate and having a plurality of extrusion holes 66 extending through the plate from one face to the other and communicating with the bore in which screw 24 is mounted, the holes being illustrated as having a relatively flat cross section at the outlet with the longest measurement in the radial direction. Holes 66 are preferably equally spaced and arranged in a circle concentric with the axis of said bore, and each hole normally would be provided with an inlet opening somewhat larger than the remainder of the hole. The particular size and shape of holes 66 may vary from one die plate to another depending upon the size and shape of the final product desired.

The present cutting mechanism is shown in detail in FIGURES 2 through 7 and consists of a knife 70 mounted on a rotatable cylinder 72 which is driven by a motor 74 through a shaft 76 and connecting member 77 seated in slots 78 and 79 in the end of the cylinder. Cylinder 72 is hollow and contains a race of ball bearings 80 secured in the hollow interior of the cylinder by a press fit, outside ring 82 contacting the inner wall and forming the only contact between the race and the cylinder. The inner ring 84 of the race seats at its edge on disc shaped insert 86 and is held firmly thereon by a cylindrical insert 88 which likewise seats on insert 86. Insert 86 seats in a recess 90 in the center of the outer face of plate 26 and the two inserts are held together and insert 86 in the recess by a screw 92 extending through the two inserts and threadedly secured in a hole 94 in the center of the plate. It is thus seen that the bearing race is held firmly in an annular groove 96 by the screw holding the inserts together, with the outer ring 82 and cylinder 72 being free to rotate carrying knife 70 past the outlet ends of the extrusion holes to cut the material extruded therefrom into sections of the desired length. It is preferable to include either a variable speed motor 74 or a mechanism for varying the speed between the motors so that the length of sections of extruded material can be varied or adjusted to the rate at which it is being extruded. Any suitable conventional speed varying mechanism can be used.

The shape of knife 70 and its position with relation to the adjacent face of plate 26 are important for satisfactory operation of the present cutting mechanism. Since the material is still in the formative stage as it emerges from the extrusion holes, i.e. it is at this point that the semi-fluid material puffs and then promptly becomes semi-brittle or brittle, it is desirable to sever the material immediately after the puffing has occurred but before the material has become brittle. A slight spacing of the knife, such as that shown in FIGURE 5, is critical for satisfactory operation of the knife on the material. The particular angle of the facets 100 and 102 on the inner side with reference to the face of the plate, and the slope of the face 104 on the outer side have been found to be important. It is noted from FIGURE 5 that the face 100 behind cutting edge 106 slopes away from the plate only slightly and face 102 at a much greater angle than that of face 100. This provides an effective long wearing cutting edge 106 and knife with substantial strength and yet removes any interference of the knife from the material continuing to emerge as the cutting edge advances across the extrusion opening and thus prevents distortion by the inner side of the knife. The slope of face 104, which is approximately at a 45 degree angle to the face of plate 26, permits the severed material or section to fall from the plate and knife without being struck by the knife with sufficient force to damage sections as they become brittle. The design of the present knife is equally applicable to the type of knife disclosed in my patents and patent applications mentioned above.

In the operation of the foregoing machine, cornmeal or the like is added to hopper 14 from the top, and head plate 26 and adjacent portions of the insert, adapter and housing are heated with any suitable type of heating means such as a blow torch or an electrical heating element, until the temperature of these members has been raised to a point above that required to cause vaporization of the moisture in the cornmeal mixture. The motor for driving the extruding mechanism, the motor for driving the beaters in chamber 18 and the motor for driving knife mechanism 28 are all placed in operation. The meal is then permitted to flow from hopper 14 into chamber 18 where it is mixed by the beaters with a small amount of water from supply pipe 110, and the resultant mixture is permitted to fall into throat 22 in the housing above screw 24. Rotation of the screw moves the mixture from the throat and propels it under substantial pressure into the inlet of holes 66 of the head plate, causing it to flow through holes 66. Since the temperature of the head plate is somewhat above the vaporization point of the moisture in the mixture, the moisture vaporizes causing the mixture mass to expand and become cellular throughout and light in texture. The temperature at which this vaporization takes place is sufficient to prebake the mixture as it passes through the head plate causing it to become firm and somewhat brittle after it leaves the plate. As the material emerges from the head plate it immediately puffs, and revolving knife 70 passing intermittently in front of holes 66 severs the extruded puffed material into sections of the desired length. The speed at which the knife revolves in relation to the rate at which the material is extruded determines the length of the sections. These sections of material represent an intermediate stage in the production of collets, the further steps including a final baking operation, salting and coating with a cheese mix or any other desirable coating mix. The material produced by the machine disclosed herein may be packaged and shipped to other plants and customers where the additional processing steps are performed.

While in the foregoing description reference has been primarily made to the production of collets from cornmeal, the machine can be used to produce similar products from other cereals.

Various changes and modifications can be made in the machine and parts of the machine disclosed herein without departing from the scope of the invention.

I claim:

1. In a food processing machine for extruding corn meal material: a plate with holes for extruding said material therethrough, said holes being equally spaced and arranged in a circle concentric with the axis of said plate, a rotatable cylinder mounted on said plate on the outlet side of said extrusion holes within said circle adjacent the center of said plate, a radially extending knife secured to the periphery of said cylinder, said knife being spaced from said plate but in close proximity thereto, the side of said knife facing said holes near the cutting edge tapering only slightly away from the face of said plate for a short distance from said edge and then tapering at a much greater angle therefrom, the opposite side of said knife extending at approximately a forty-five degree angle to the face of said plate away from said cutting edge, and a motor positioned in front of said plate for rotating said cylinder at a predetermined speed for cutting the material extruded from said holes into sections of the desired length.

2. In a food processing machine for extruding cereal material: a plate with holes for extruding said material therethrough, said holes being arranged in a circle concentric with the axis of said plate, a rotatable cylinder mounted on said plate on the outlet side of said extrusion holes adjacent the center of said plate, a radially extending knife secured to the periphery of said cylinder, said knife being spaced from said plate but in close proximity thereto, the side of said knife facing said holes near the cutting edge tapering only slightly away from the face of said plate for a short distance from said edge and then tapering at a much greater angle therefrom, and a motor in front of the plate for rotating said cylinder at a predetermined speed for cutting the material extruded from said holes into sections of the desired length.

3. In a food processing machine for extruding cereal material: a plate with a solid center portion and with holes for extruding said material therethrough spaced from the center, said holes being arranged in a circle concentric with the axis of said plate, a continuously rotatable cylinder mounted on said plate on the outlet side of said extrusion holes adjacent the center of said plate, a radially extending knife secured to the periphery of said cylinder, said knife being spaced from said plate but in close proximity thereto, and a motor positioned on the outlet side of said plate for rotating said cylinder at a predetermined speed for cutting the material extruded from said holes into sections of the desired length.

4. In a food processing machine for extruding cereal material: a plate with a solid center portion and with holes for extruding said material therethrough spaced from the center, said holes being arranged in a circle, a continuously rotatable member mounted directly on the plate on the outlet side of said extrusion holes at the center of said plate, a radially extending knife secured to said member, said knife being spaced from said plate but in close proximity thereto, and a power means for rotating said member for cutting the material extruded from said holes into sections of the desired length.

5. In a food processing machine for extruding cereal material: a plate with holes for extruding said material therethrough, said holes being arranged in a circle concentric with the axis of said plate, a rotatable member on the outlet side of said plate adjacent the center thereof, a knife driven by said member so mounted in relation to said plate to pass in close proximity to the outlet ends of said extrusion holes but spaced therefrom, the side of said knife facing said holes near the cutting edge having a facet tapering only slightly away from the face of said plate for a short distance from said edge and a facet tapering at a much greater angle therefrom, the opposite side of said knife extending at approximately a forty-five degree angle to the face of said plate away from said cutting edge, said second mentioned facet and said opposite side converging toward said first mentioned facet, and a motor for driving said knife at a predetermined speed for cutting the material extruded from said holes into sections of the desired length.

6. In a food processing machine for extruding cereal material: a plate with holes for extruding said material therethrough, a rotatable member on the outlet side of said plate adjacent the center thereof, a knife driven by said member so mounted in relation to said plate to pass in close proximity to the outlet ends of said extrusion holes but spaced therefrom, the side of said knife facing said holes near the cutting edge having a facet tapering only slightly away from the face of said plate for a short distance from said edge and a facet tapering at a much greater angle therefrom, the opposite side of said knife extending at approximately a forty-five degree angle to the face of said plate away from said cutting edge, said second mentioned facet and said opposite side converging toward said first mentioned facet, and a power means for driving said knife at a predetermined speed for cutting the material extruded from said holes into sections of the desired length.

7. In a food processing machine for extruding cereal material: a plate with holes for extruding said material therethrough, a rotatable member on the outlet side of said plate adjacent the center thereof, a knife driven by said member so mounted to pass in close proximity to the outlet ends of said extrusion holes but spaced therefrom, the side of said knife facing said holes near the cutting edge having a facet tapering only slightly away from the face of said plate for a short distance from said edge and a facet tapering at a much greater angle therefrom, said second mentioned facet and said opposite side converging toward said first mentioned facet, and a power means for driving said knife for cutting the material extruded from said holes into sections of the desired length.

8. In a food processing machine for extruding cereal material: a plate with holes for extruding said material therethrough, a rotatable member on the outlet side of said plate adjacent the center thereof, a knife driven by said member for cutting said material into sections of the desired length upon emerging from said holes, the side of said knife facing said holes near the cutting edge having a facet tapering only slightly away from the face of said plate for a short distance from said edge and a facet tapering at a much greater angle therefrom, the opposite side of said knife extending at approximately a forty-five degree angle to the face of said plate away from said cutting edge, and a power means for driving said knife, said second mentioned facet and said opposite side converging toward said first mentioned facet.

9. In a food processing machine for extruding cereal material: a plate with holes for extruding said material therethrough, a rotatable member on the outlet side of said plate adjacent the center thereof, and a knife driven by said member for cutting said material into sections of the desired length upon emerging from said holes, the side of said knife facing said holes near the cutting edge having a facet tapering only slightly away from the face of said plate for a short distance from said edge and a facet tapering at a much greater angle therefrom, said second mentioned facet and said opposite side converging toward said first mentioned facet.

References Cited in the file of this patent

UNITED STATES PATENTS

| | | |
|---|---|---|
| 1,773,552 | Sizer | Aug. 19, 1930 |
| 1,881,171 | Cooley | Oct. 4, 1932 |
| 2,144,055 | Hall | Jan. 17, 1939 |
| 2,178,431 | Orr | Oct. 31, 1939 |
| 2,186,415 | Haworth | Jan. 9, 1940 |
| 2,401,236 | Fielitz | May 28, 1946 |
| 2,432,326 | Meakin | Dec. 9, 1947 |
| 2,565,830 | Weston | Aug. 28, 1951 |
| 2,842,072 | Graves | July 8, 1958 |
| 2,845,036 | Fisher | July 29, 1958 |
| 2,905,109 | Shrenk | Sept. 22, 1959 |

FOREIGN PATENTS

| | | |
|---|---|---|
| 841,229 | France | Feb. 1, 1939 |
| 491,864 | Italy | Mar. 11, 1954 |